J. B. HAWKS & H. R. KENNEDY.
VEHICLE SIGNAL.
APPLICATION FILED NOV. 19, 1913.
1,118,416. Patented Nov. 24, 1914.
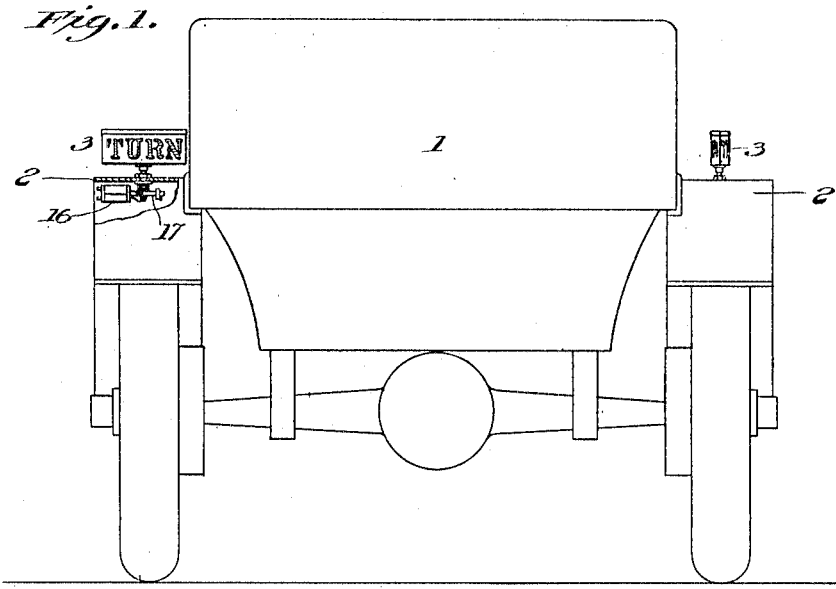
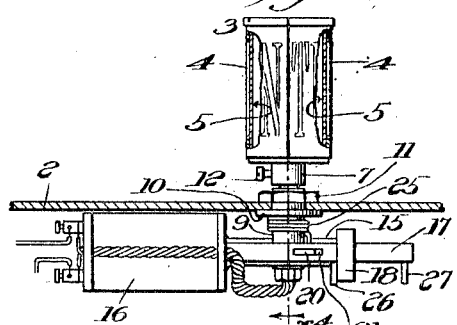
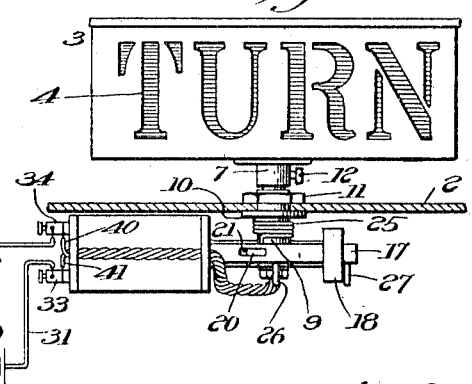
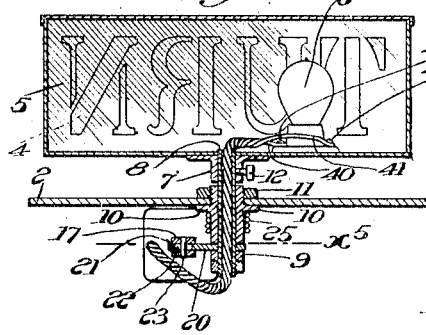
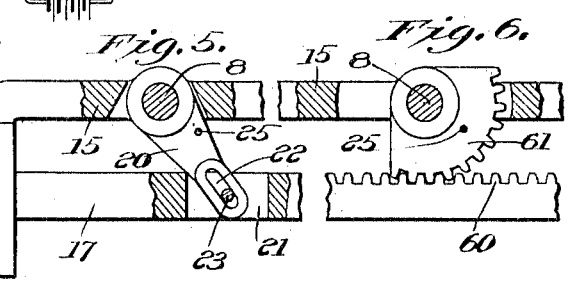
Witnesses:
Alan Franklin
Luta D. Atter
Inventor
Joseph B. Hawks
Homer R. Kennedy

UNITED STATES PATENT OFFICE.

JOSEPH B. HAWKS AND HOMER R. KENNEDY, OF LOS ANGELES, CALIFORNIA.

VEHICLE-SIGNAL.

1,118,416.   Specification of Letters Patent.   Patented Nov. 24, 1914.

Application filed November 19, 1913. Serial No. 801,329.

*To all whom it may concern:*

Be it known that we, JOSEPH B. HAWKS and HOMER R. KENNEDY, citizens of the United States, residing at Los Angeles, in the county of Los Angeles and State of California, have invented a new and useful Vehicle-Signal, of which the following is a specification.

This invention is a signal adapted to be placed upon a vehicle and operated by a person in the vehicle, to notify others of a maneuver about to be made by the vehicle.

The object of the invention is to provide a vehicle signal which will be simple in construction, positive and instantaneous in its action, and efficient in operation.

Referring to the drawings: Figure 1 is a rear elevation of an automobile equipped with my invention, one of the signals being shown in non-signaling position, and the other in signaling position. Fig. 2 is an enlarged elevation of my invention, with the parts thereof in non-signaling position. Fig. 3 is a view similar to Fig. 2, with the parts shown in signaling position. Fig. 4 is a vertical sectional view taken on line $x^4$ of Fig. 2. Fig. 5 is a fragmentary sectional view on an enlarged scale taken on line $x^5$ of Fig. 4. Fig. 6 is a fragmentary sectional view of a modification of my invention.

The signal is adapted to be placed in any suitable position on the vehicle, and when placed upon an automobile 1 it may be mounted upon the guards 2 thereof, so that it may be seen by persons either in the front or in the rear of the machine. The signal comprises a semaphore 3 upon which is placed the indicia, which in the present embodiment of my invention is the word "Turn", indicating a maneuver which the vehicle is about to make. The semaphore may be constructed in the form of a box, in the side walls of which are formed stencils 4 forming the signaling word "Turn", which may be seen from the front and rear of the vehicle when the semaphore is turned into signaling position. Colored transparent panels 5 of a different color from the color of the outside of the stencil walls of the semaphore, are placed against the inside of the stencils, so that the letters of the stencil may be easily read in the day time. Within the semaphore is placed an electric lamp 6, adapted to project its rays, when lighted in the manner hereinafter described, through the panel 5 and the stencil 4, so that the letters of the stencil may be read at night. A hollow boss 7 is located in the bottom wall of the semaphore and is adapted to fit on the upper end of a hollow shaft 8, journaled in bearing 9 which extends through the guard 2 and is secured thereto by means of a shoulder 10 on the bearing, which shoulder rests against the under surface of the guard, and a nut 11 which screws on the upper end of the bearing against the upper surface of the guard. A set screw 12 extends through the boss 7 and engages the shaft 8 whereby the semaphore is secured in the desired position to the shaft 8. A frame 15 is formed on the lower end of the bearing 9 and supports a solenoid 16 underneath the guard 2. The solenoid 16 is provided with a movable core 17, the outer end of which is mounted to reciprocate in bearing 18 on the frame 16. In the form of my invention illustrated in Fig. 1, an arm 20 is secured to the shaft 8, the swinging end of which fits into a slot 21 in the core 17, and is provided with a slot 22 which receives a pin 23 on the core 17, so that said arm, shaft 8, and semaphore 3 will turn when the core is reciprocated. A coil spring 25 surrounds the bearing 9, and is connected at its respective ends to said bearing and to said arm. Said spring normally maintains the core 17 in its outermost position and the semaphore 3 in its non-signaling position. Pins 26 and 27 on the core 17 engage the bearing 18 and thereby limit the reciprocating movement of the core. An electric current is supplied to the solenoid 16 from battery 30 through wires 31 and 32 which are connected to the respective terminals 33 and 34 of the solenoid, whereby the solenoid is energized to draw the core 17 inwardly. Current is supplied to the lamp 6 through wires 40 and 41 which extend through the hollow shaft 8 and are connected at their respective ends to the solenoid terminals 33 and 34 respectively, and to the lamp terminals 42 and 43 respectively. A push button switch 50 controls the solenoid circuit which switch may be placed within reach of the driver of the vehicle.

The operation is as follows: When the driver is about to make a maneuver with the vehicle, as for example, when he is about to turn the vehicle, he presses the push button 50, which closes the solenoid circuit. The solenoid 16 draws the core 17 inwardly until the pin 27 engages the bearing 18, which movement of the core through the medium of pin 22, arm 20, and shaft 8, turns the semaphore 3 into signaling position. When the button is released the circuit is broken and the spring 25 through the medium of arm 20 and pin 22, draws the core 17 out of the solenoid until the pin 26 engages the bearing 18, and the semaphore is turned back to its non-signaling position through the medium of arm 20 and shaft 8, in which position the semaphore is maintained by the spring and the engagement of the pin 26 with the bearing 18 until the solenoid circuit is again closed by the switch.

In the modified form of my invention illustrated in Fig. 6, a rack 60 is formed on the core 17 and a toothed segment 61 secured on the shaft 8 which meshes with said rack, are substituted for the arm 20 and pin 22, and perform the same function as said arm and pin when the semaphore is turned.

What I claim is:

A vehicle signal comprising a frame, a semaphore mounted upon said frame, a solenoid mounted upon said frame, connections between said semaphore and the solenoid core to enable the solenoid to turn the semaphore to signaling position, means for restoring the semaphore to non-signaling position, and pins on said solenoid core for engaging said frame to limit the movement of said core and to arrest the semaphore in signaling and in non-signaling position.

In testimony whereof, we have hereunto set our hands at Los Angeles, California, this 11th day of November, 1913.

JOSEPH B. HAWKS.
HOMER R. KENNEDY.

In presence of—
ALAN FRANKLIN,
LORRAINE E. DURROW.